J. E. BELL.
VERTICAL WATER TUBE BOILER.
APPLICATION FILED JULY 21, 1915.
1,266,906.
Patented May 21, 1918.
3 SHEETS—SHEET 2.
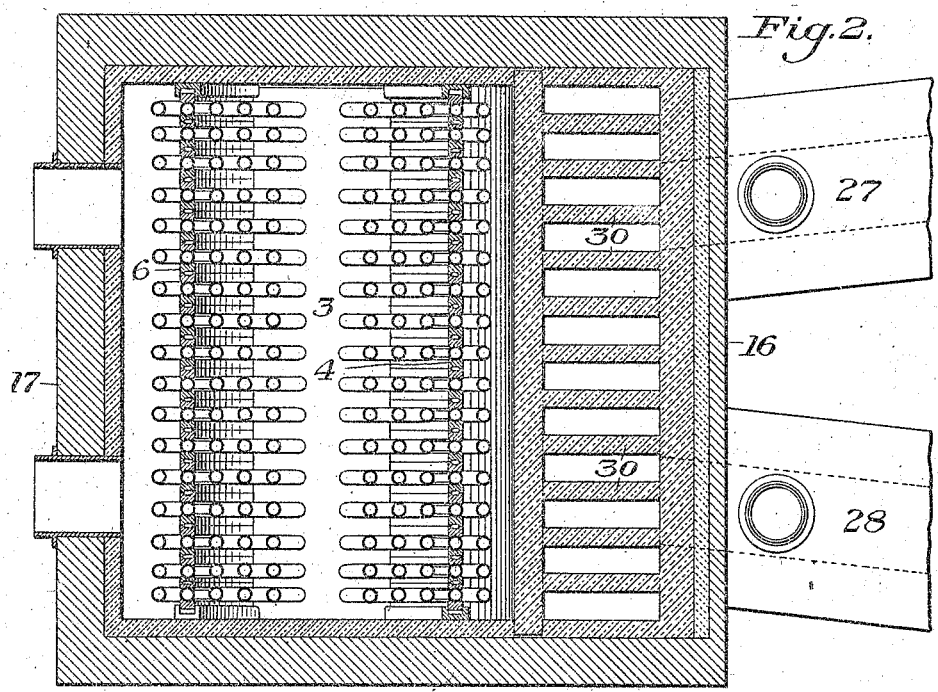
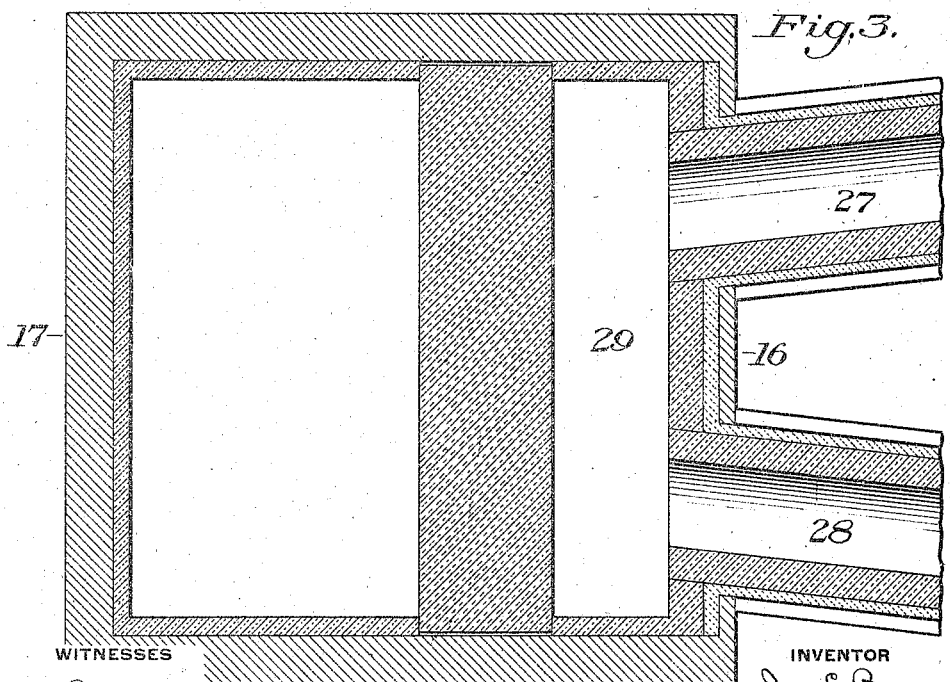
WITNESSES
INVENTOR
Jno. E. Bell,

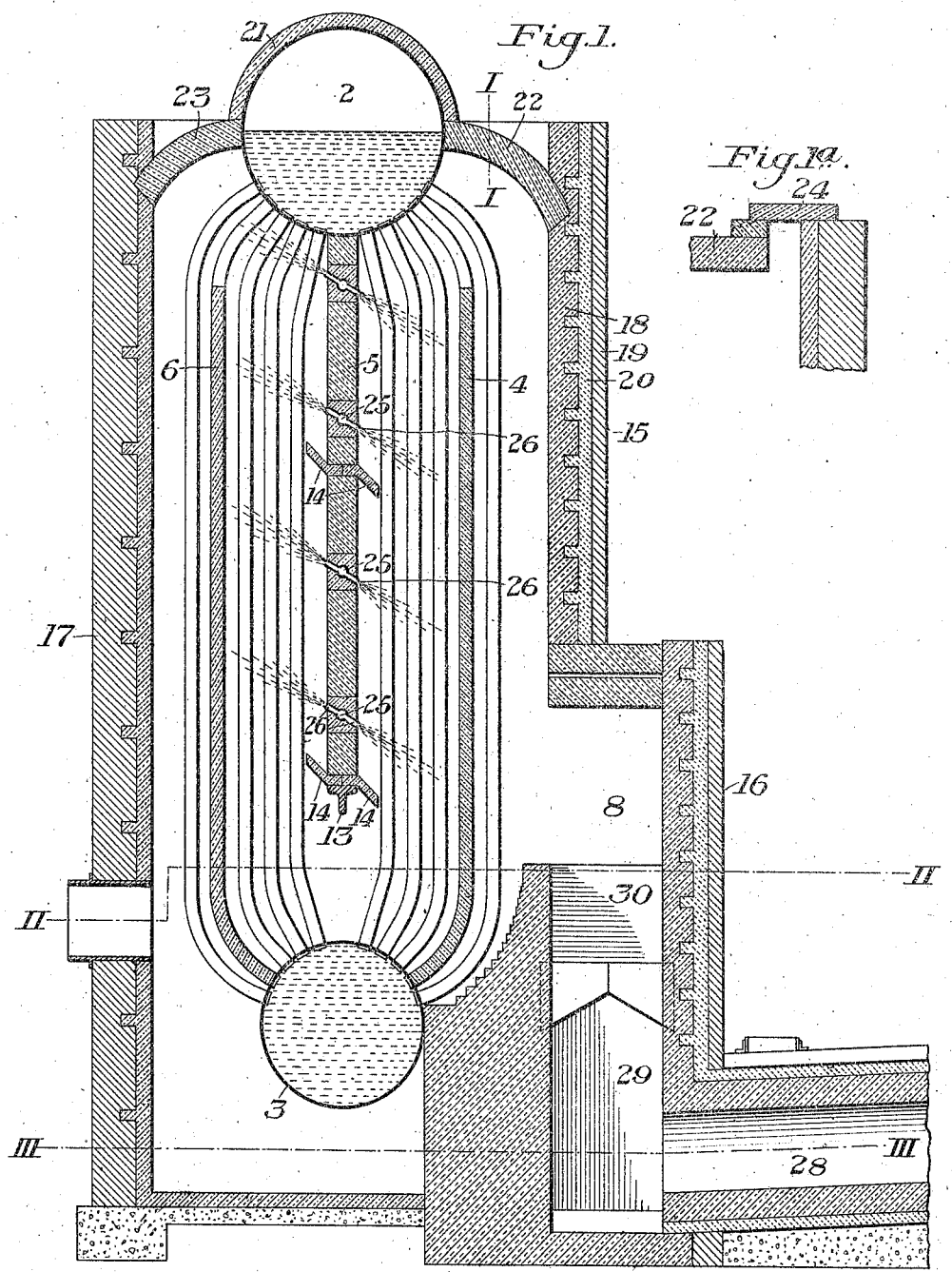

J. E. BELL.
VERTICAL WATER TUBE BOILER.
APPLICATION FILED JULY 21, 1915.

1,266,906.

Patented May 21, 1918.
3 SHEETS—SHEET 3.

WITNESSES
R. H. Balderson
H. M. Corwin

INVENTOR
Jno. E. Bell,
by Bakewell, Byrnes & Parmelee
Attys.

UNITED STATES PATENT OFFICE.

JOHN E. BELL, OF NEW YORK, N. Y.

VERTICAL WATER-TUBE BOILER.

1,266,906.  Specification of Letters Patent.  Patented May 21, 1918.

Application filed July 21, 1915. Serial No. 41,089.

*To all whom it may concern:*

Be it known that I, JOHN E. BELL, a citizen of the United States, residing at New York, in the county of New York and State of New York, have invented a new and useful Vertical Water-Tube Boiler, of which the following is a full, clear, and exact description, reference being had to the accompanying drawings, forming part of this specification, in which—

Figure 1 is a sectional side elevation showing one form of my improved boiler.

Fig. 1ª is a detail sectional view on the line I—I of Fig. 1.

Fig. 2 is a horizontal section on the line II—II of Fig. 1.

Fig. 3 is a horizontal section on the line III—III of Fig. 1.

Figure 4:
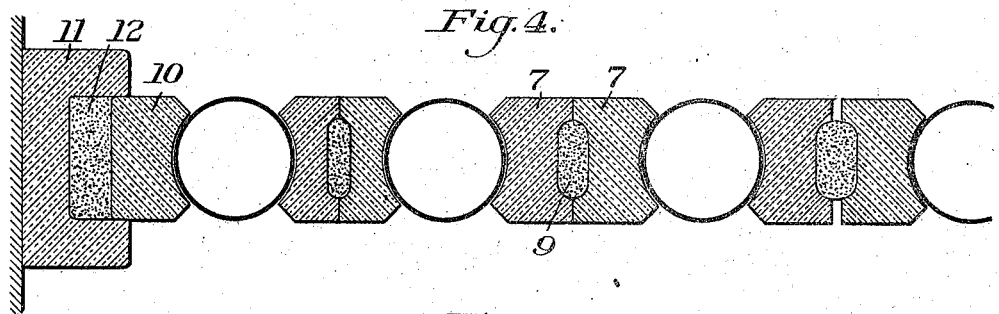
Fig. 4 is an enlarged detail view showing the arrangement of baffling which I prefer to employ.

My invention relates to that class of vertical water tube boilers wherein an upper transverse steam and water drum is connected to a lower transverse mud drum by water tubes which are divided into sets with baffling between. The baffling directs the gases in a serial up and down flow among the tubes.

The object of the invention is to improve the economy and efficiency of such boilers and also to provide improved soot blowers, and improve the baffling; as well as the furnace structure thereof, particularly where gaseous fuel is used.

In the drawings, 2 represents an upper transverse steam and water drum, and 3 a corresponding mud drum, these drums being connected by water tubes which are shown as bent in the present form, although they may be straight, if desired, and connected to tube seats or upset portions of the drums. The tubes are shown as divided into four sets by means of a front baffle 4, a middle baffle 5, and a rear baffle 6 interposed between the tubes. The front baffle 4 and the rear baffle 6 are preferably made of special tile, which are arranged between the tubes forming a row at the front portion of the entire set of tubes. I have shown these tiles 7 as interposed between the tubes of the second row from the front and partially surrounding these tubes, while leaving the front and rear portions of the tubes exposed. The front portion of the second row of tubes is exposed to the gases in their pass upward from the furnace chamber 8, while the rear portions of these same tubes are exposed to the gases in their second and downward pass in front of the baffle 5.

Figure 5:
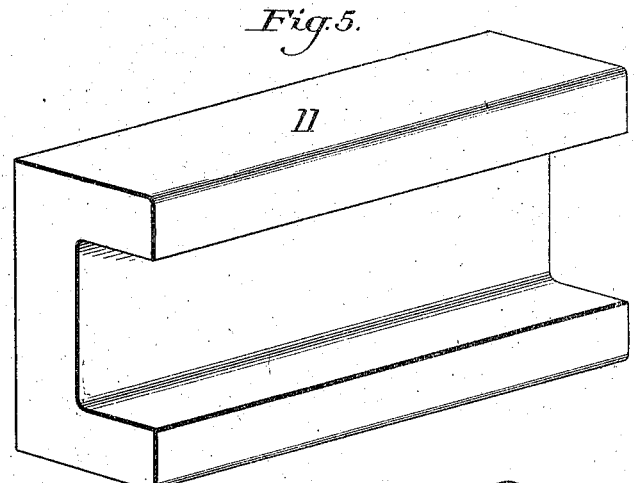
Figs. 5, 6 and 7 are perspective detail views showing the different types of baffle brick which I prefer to employ.
Figure 6:
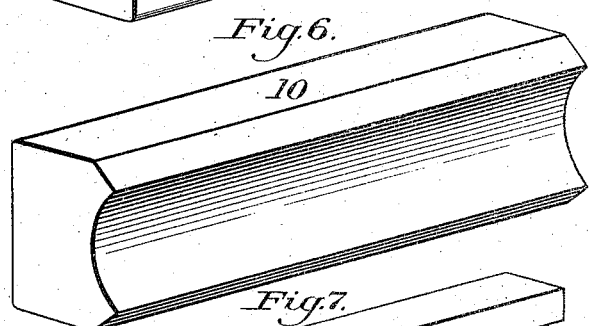
Figure 7:
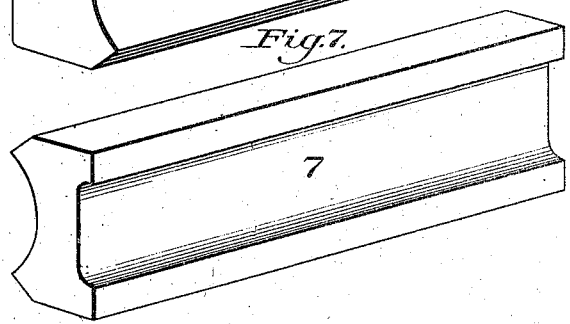

These special baffles 4 and 6 are preferably formed of special tile such as shown in Figs. 4 to 7 inclusive, each tile being made in halves with a space between them for receiving refractory plastic material 9. This provision allows for unequal spacing between the tubes of the row, which usually occurs, and also provides for expansion and contraction under heat. To fit any particular case, the tiles, if not of the proper size, can be chipped somewhat. They may also be spaced somewhat by the filling 9. The side block of the row, shown at 10, may enter a recess in a refractory side block 11, which recess also contains the refractory loose or plastic material 12. In Fig. 5 I show a perspective view of the block 11, Fig. 6 showing a similar view of the block 10; while Fig. 7 shows a view of one of the intermediate tile blocks.

The middle baffle 5 is preferably a substantial wall of refractory brick carried on the lower transverse T-beam support 13, and extending therefrom up to the upper drum. Within this wall are preferably built the deflector tiles 14, which as shown are inclined in the direction of flow of the gases. By this inclination these deflector tiles serve to direct the gases into the heating surface without material obstruction of the flow.

The back baffle 6 is preferably placed near the rear of the tubes, it being shown between the tubes of the second row from the rear.

The furnace setting is preferably built so that the front wall portion 15 is adjacent to the front row of tubes, it being shown as stepped inwardly from the wall 16 of the combustion chamber 8 to bring it nearer to the tubes. Similarly the rear setting wall 17 is arranged close to the rear row of tubes. The front wall 15 will become highly heated by the flame and gases, thus subjecting the front tubes to radiant heat, and increasing the capacity and economy of the boiler. The arrangement of the front and rear walls in connection with the front and rear baffles causes the gases to sweep over the walls at a high velocity. The walls will, on this account, absorb heat rapidly from the gases, and will be elevated in temperature until the amount of heat radiated to the cooler tube surface, plus the loss by conduction through the wall, equals the amount of heat absorbed from the gases. The higher the velocity of the gases, the greater will be the amount of heat absorbed in this way and radiated to the tubes. Reducing the loss through the wall acts in the same way. Arranging the baffling as shown consequently makes the front and rear walls act as a portion of the boiler heat absorbing surface.

The front wall preferably has a lining 18 of firebrick, between which and the outer wall 19 of common brick is preferably provided an intermediate layer 20 of high heat resisting or insulating material, such as brick made from diatomaceous earth. The same is also preferably the case with the wall 16. By this construction, while the wall becomes very hot on its inner face, comparatively little heat will be lost through conduction.

The boiler proper is preferably supported from the upper drum. This upper drum being carried on the structural iron work and, in turn, supporting the tubes and the lower drum. The middle wall or baffle 5 can, therefore, be carried from the setting walls and can be built up gas-tight to the upper drum without causing trouble from expansion or contraction.

I preferably connect the covering 21 of the upper drum with the front and rear walls by arches 22 and 23, which will better conform to the natural flow lines of the gases, preventing pocketing of the gases, and will be more substantial and less liable to become injured.

As shown in Fig. 1ª, a hole may be made through this arch and between the arch and the side wall through which tubes may be removed and replaced. This hole may be covered by a suitable tile 24. Heretofore, in boilers of this type, instead of arches such as I provide at 22 and 23, there has been a flat top wall consisting of bricks supported on T-irons, and which is removed in taking out and putting in tubes. This is a very light and flimsy construction, and also gives large losses by heat radiation and by the cooling effect due to infiltration of air. These objections are avoided by the provision of the arches, having an opening or openings through which the tubes can be inserted and removed.

In connection with the middle wall or baffle 5, I preferably provide soot blowers 25, which may be built into the wall solidly without any expansion joint or flexible connection, because this baffle wall and the side walls form a connected structure. If, however, this baffle is supported from the boiler, the flexible joint should be used for the soot blower connections. These soot blowers comprise the transverse pipes 25 built into the wall, each having a series of nozzles 26 which discharge in opposite directions among the tubes. These nozzles are preferably inclined in the direction of the gaseous flow to assist the draft.

In the form shown, a gaseous mixture of gas and air is fed through the supply channels 27 and 28 into the common chamber 29, between which and the chamber 8 is provided a series of partition walls 30, as shown in Fig. 2, which split up the mixture into a series of streams. This gives an even distribution of the mixture throughout the width of the boiler and aids in securing complete combustion. It also aids in mixing the air and gas.

The advantages of my invention result from the type of baffling used, the special arrangement of the setting, the character of tiles used in the special baffles, the soot blower combination, etc.

The number of tubes may be varied, the type of baffle bricks may be changed, and many other changes may be made without departing from my invention as covered by the claims.

I claim:

1. A vertical water tube boiler, consisting of a transverse steam and water drum and a transverse mud drum, rows of water tubes connecting said drums, a central baffle extending from the steam and water drum to a point above the mud drum, and a second baffle in front of the first baffle supported on the mud drum and held in position by the tubes in one of the rows of tubes in front of the central baffle; substantially as described.

2. A vertical water tube boiler, comprising a transverse steam and water drum, a transverse mud drum, rows of water tubes connecting said drums, there being one set of tubes in front of the structure and the other in the rear of the structure, a central baffle between the two sets of tubes extending from the steam and water drum to a point above the mud drum, a front baffle supported by the tubes in one row of the front set and extending to a point below the steam and water drum, a third baffle supported by the mud drum and held in position by the tubes of the rear set, said rear baffle extending to a point adjacent to the steam and water drum; substantially as described.

3. A vertical water tube boiler, consisting of a single transverse steam and water drum, a single transverse mud drum, two sets of water tubes connecting the steam and water drum to the mud drum, each set comprising a plurality of rows of tubes, a central baffle between the two sets of tubes extending from the steam and water drum to a point above the mud drum, a support for the lower end of said baffle, a front baffle supported on the mud drum and held in position by the tubes in the second row of the front set, said baffle extending from the mud drum to a point adjacent to the steam and water drum, and a second baffle supported on the mud drum and held in position by the tubes forming next to the last row of tubes in the back set, said baffle extending to a point adjacent to the steam and water drum in order to provide two up passes and two down passes for the gases; substantially as described.

In testimony whereof, I have hereunto set my hand.

JOHN E. BELL.

Witnesses:
 ELIZABETH ARMSTRONG,
 F. FALLA.